(12) United States Patent
Tan et al.

(10) Patent No.: US 9,801,489 B2
(45) Date of Patent: Oct. 31, 2017

(54) COOKER

(71) Applicant: KONINKLIJKE PHILIPS N.V., Eindhoven (NL)

(72) Inventors: Jingwei Tan, Eindhoven (NL); Yun Chen, Eindhoven (NL)

(73) Assignee: KONINKLIJKE PHILIPS N.V., Eindhoven (NL)

(*) Notice: Subject to any disclaimer, the term of this patent is extended or adjusted under 35 U.S.C. 154(b) by 43 days.

(21) Appl. No.: 14/410,133

(22) PCT Filed: Jun. 17, 2013

(86) PCT No.: PCT/IB2013/054945
§ 371 (c)(1),
(2) Date: Dec. 22, 2014

(87) PCT Pub. No.: WO2014/001951
PCT Pub. Date: Jan. 3, 2014

(65) Prior Publication Data
US 2015/0320252 A1   Nov. 12, 2015

(30) Foreign Application Priority Data

Jun. 27, 2012   (WO) ................ PCT/CN2012/077641

(51) Int. Cl.
*A47J 27/00* (2006.01)
*A47J 27/21* (2006.01)
*A23L 5/10* (2016.01)

(52) U.S. Cl.
CPC ................ *A47J 27/21* (2013.01); *A23L 5/13* (2016.08); *A47J 27/00* (2013.01); *A23V 2002/00* (2013.01)

(58) Field of Classification Search
CPC .......... A47J 27/00; A47J 27/21; A23L 1/0121
USPC .......... 99/330, 331, 332, 333, 403; 219/432, 219/436, 391, 435, 492, 400, 518, 494, 219/497, 506, 442, 386, 390
See application file for complete search history.

(56) References Cited

U.S. PATENT DOCUMENTS

| | | | | |
|---|---|---|---|---|
| 2008/0053984 | A1* | 3/2008 | Gaynor | F27D 11/00 219/442 |
| 2008/0083730 | A1* | 4/2008 | Dolgov | F27D 11/00 219/432 |
| 2010/0196572 | A1* | 8/2010 | Sloot | A23L 1/01 426/510 |
| 2011/0117259 | A1* | 5/2011 | Storek | A47J 36/14 426/509 |

FOREIGN PATENT DOCUMENTS

| | | |
|---|---|---|
| CN | 2253168 Y | 4/1997 |
| CN | 1626009 A | 6/2005 |

(Continued)

*Primary Examiner* — Phuong Nguyen

(57) ABSTRACT

A cooker comprises a cooking chamber configured to cook food with water; a first unit configured to feed water to the cooking chamber; a second unit configured to obtain information related to an interruption of the cooking; and a controller configured to operate the first unit according to the information related to the interruption, after the cooking recovers from the interruption. With the cooker, the influence of the interruption on the cooking process, in particular on the water fed to the cooking chamber, is taken into account, which helps to improve the taste of the cooked food.

9 Claims, 2 Drawing Sheets

(56) References Cited

FOREIGN PATENT DOCUMENTS

| | | | |
|---|---:|---|---:|
| JP | 60244266 | A | 12/1985 |
| JP | 3141912 | A | 10/1989 |
| JP | 3030713 | A | 2/1991 |
| JP | 3141910 | A | 6/1991 |
| JP | 3141911 | A | 6/1991 |
| JP | 3234215 | A | 10/1991 |
| JP | 1031474 | A | 2/1998 |
| JP | 200489254 | A | 3/2004 |
| JP | 2004105488 | A | 4/2004 |
| JP | 2005000486 | A | 1/2005 |
| JP | 2005204921 | A | 8/2005 |
| JP | 2006325823 | A | 12/2006 |
| JP | 2007289671 | A | 11/2007 |
| JP | 2008-67899 | A | 3/2008 |
| JP | 2011024658 | A | 2/2011 |
| KR | 20040108039 | A | 12/2004 |

\* cited by examiner

COOKER

This application is the U.S. National Phase application under 35 U.S.C. §371 of International Application No. PCT/IB2013/054945, filed on Jun. 17, 2013, which claims the benefit of International Application No. PCT/CN2012/077641 filed on Jun. 27, 2012. These applications are hereby incorporated by reference herein.

TECHNICAL FIELD

The present invention relates to kitchenware, and particularly to cookers and methods for cooking food.

BACKGROUND OF THE INVENTION

Cooker is a commonly used kitchenware. A Japanese patent with publication number JP3141911A discloses a rice cooker. The patent specifically discloses that a power failure detection means outputs a signal during AC power supply to a cooker and stops the signal output when the power supply is stopped. A control means receives inputs from a menu selection switch and a start switch to control a cooking means and starts cooking according to the menu. When a timer limit is input, the cooking means finishes cooking in the limit time. A power failure compensation means continues to memorize the cooking menu, the cooking process, and the timer limit stored in the control means only for a specified power failure compensation period in case of a power failure. A power restoration means resumes cooking after power restoration and performs the water absorption process including the power failure period. In the case of a power failure during other processes for the polished rice or other menus, cooking is resumed after the power restoration from the specified cooking process.

SUMMARY OF THE INVENTION

JP3141911A achieves the effect of boiled rice softened to the cores of rice grains in case of a power failure during a water absorption process, by performing the water absorption process for a specified period of time including the power failure period after power restoration and resuming the rice cooking. However, JP3141911A aims at the traditional rice cooker, wherein no more water is added to or drained from the rice cooker during the cooking process.

In order to obtain a more diversified target taste, it is advantageous that the water will be added automatically during the rice cooking process. Water might be added more than once based on the cooking program.

Sometimes, the cooking might be interrupted for instance by short of the electricity, or by other factors, e.g., the user moves or removes the cooking chamber temporarily. In the followings, the term "interruption" is used to represent the stop of cooking temporarily which is not according to the predetermined cooking program. When the power recovers or the user moves the cooking chamber back to in contact with the heater, the interruption recovers.

For the rice cooker which could add water automatically and the water are added several times during the cooking, the prior art for cooking after power failure is not suitable any more. The reasons are:

Water dosage and temperature added during the cooking is related with the cooking phases. When interruption occurs, the temperature of the rice will be different. When the interruption recovered, the temperature and dosage of the water required for feeding the rice will need to be adjusted to meet the current phase. It may not be the same as the original cooking program.

When interruption occurs at the moment when the cooker is feeding water to the rice chamber, the cooker needs to manage this as well.

Therefore, the embodiments of the present invention propose cookers and methods for cooking food after interruption.

In one embodiment of a first aspect of the present invention, there is provided a cooker, comprising: a cooking chamber configured to cook food with water; a first unit configured to feed water to the cooking chamber; a second unit configured to obtain information related to an interruption of the cooking; and a controller configured to operate the first unit according to the information related to the interruption, after the cooking recovers from the interruption.

In this embodiment, the first unit is operated by the controller to feed water to the cooking chamber according to the information related to the interruption. Therefore, the influence of the interruption on the cooking process, in particular the water fed to the cooking chamber, is taken into account, which helps to improve the taste of the cooked food.

In another embodiment of the present invention, the information related to the interruption comprises at least one of the following: a cooking phase of the food at the time of the interruption, a time duration of the interruption, a first temperature of the food when the cooking recovers from the interruption, a detection of the interruption.

In this embodiment, one information alone, two or all of the information may be used to help the controller to operate the first unit to feed water to the cooking chamber more flexibly.

In another embodiment of the present invention, the first unit is configured to feed the water to the cooking chamber according to a first scheme in case that no interruption occurs, wherein the controller is further configured to determine whether the interruption is shorter than a time duration threshold, and operate the first unit to feed the water according to the first scheme if the interruption is shorter than the time duration threshold, or the controller is further configured to operate the first unit to feed the water according to a second scheme different from the first scheme if the interruption is not shorter than the time duration threshold.

In this embodiment, the duration of the interruption is used to determine whether a different scheme may be applied. If the interruption is shorter than a time duration threshold, the influence of the interruption on the cooking process may be negligible and the original first scheme is still applicable. While if the interruption is longer or equal to the time duration threshold, the influence of the interruption on the cooking process may not be omitted and a second scheme which is different from the first scheme should be adopted.

In another embodiment, the food comprises starch-containing food, and the cooking phase comprises any one of the followings: a leaching-out phase, a heating phase, a boiling phase and a saturation phase, wherein a time duration threshold is dependent on the corresponding cooking phase. Since different time duration threshold is set respectively for different cooking phases, the duration of interruption occurred at different cooking phases may be used differently to control the subsequent cooking process after the interruption recovers.

In another embodiment, according to the first scheme, the first unit is configured to feed a first amount of water to the cooking chamber after the time of interruption, according to the second scheme, a second amount of water is fed to the cooking chamber after the cooking recovers, wherein the second amount is less than the first amount.

In this embodiment, the controller determines that the second amount of water to be added after the interruption is less than the first amount originally determined, considering that the water and the rice continues to react with each other during the interruption.

In another embodiment, the controller is further configured to determine a second temperature based on the first temperature, and operate the first unit to feed water at the second temperature after the cooking recovers.

In this embodiment, since the newly added water is of the temperature based on the temperature of the food when the cooking recovers from the interruption, the temperature of the water in the cooking chamber keeps unchanged after the water is newly fed into the cooking chamber, therefore the food is well cooked, the core of the rice grains may have the same hardness with that of the surface of the rice grains.

In another embodiment, the first unit is configured to feed the water to the cooking chamber according to a first scheme in case that no interruption occurs, the controller is further configured to operate the first unit to feed the water according to the first scheme after the cooking recovers from the interruption if the cooking phase at the time of the interruption is a heat preserving phase; or the controller is further configured to operate the first unit to feed the water according to a second scheme different from the first scheme after the cooking recovers from the interruption if the cooking phase at the time of the interruption is one of a heating phase, a boiling phase, or a saturation phase.

In this embodiment, the cooking phase of the food at the time of the interruption may be used to determine whether a different scheme may be applied after the interruption recovers. In this embodiment, the water fed to the cooking chamber is originally controlled by a first scheme which does not take the interruption into consideration.

On the one hand, since the cooking phases of the leaching-out phase, the heating phase, the boiling phase or the saturation phase is sensitive to the temperature and ratio of water to rice, the influence of interruption during these phases can not be neglected. If the cooking phase when the interruption occurs corresponds to any one of the above, then after the interruption, the controller determines that the first scheme is not applicable, and a different scheme may be applied, so as to compensate the influence of the interruption on the cooking process.

On the other hand, the major food cooking process is completed in the heat preservation phase; therefore this phase is not very sensitive to the interruption. If the interruption occurs when the cooking is in the heat preservation phase, then the original first scheme may still be applicable.

In another embodiment, according to the first scheme the cooking chamber is configured to cook the food in the current cooking phase for a remained time duration, when the cooking phase is interrupted; the controller is further configured to control the cooking chamber to resume the interrupted cooking phase for a time period shorter than the remained time period.

In this embodiment, since the food has been maintained in the cooking phase after the interruption occurs, the controller determines the duration that the food shall be cooked after the interruption recovers as less than the originally determined remained time duration.

In another embodiment, the controller is configured to control the cooking chamber to resume the interrupted cooking phase for a time period shorter than the remained time period if the interrupted cooking phase is any one of the following: a leaching-out phase, a heating phase, a boiling phase, a saturation phase.

In another embodiment, the cooker further comprises a backup power module for providing electricity for supplying water to the cooking chamber within the interruption.

In this embodiment, with the backup power module, the process of adding or discharging water may be guaranteed even if the interruption occurs just at the moment that the first unit is adding water into or discharging water from the cooking chamber.

In another aspect of the present invention, there is provided a method of cooking food, comprising the steps of: obtaining information related to an interruption of the cooking, if the cooking is interrupted; and cooking the food by feeding water to the cooker according to the information related to the interruption, after the cooking recovers from the interruption.

BRIEF DESCRIPTION OF THE DRAWINGS

Features, aspects and advantages of the present invention will become obvious by reading the following description of non-limiting embodiments with the aid of appended drawings. Wherein, same or similar reference numerals refer to the same or similar steps or means.

DETAILED DESCRIPTION OF EMBODIMENTS

The cooker of the present can be used to cook vegetables, fruits, and starch-containing food. Starch-containing food comprises pumpkins, winter squashes, red beans, Coix Seeds (or also called Pearl Barley), broad beans, soybeans, mung beans, red beans, potatoes, and other grains, whose starch contents is more than 10% depending on different cultivar, and can be regarded as staple foods. Here, the cooking of starch-containing, in particular the rice, will be taken as an example first.

Figure 1:
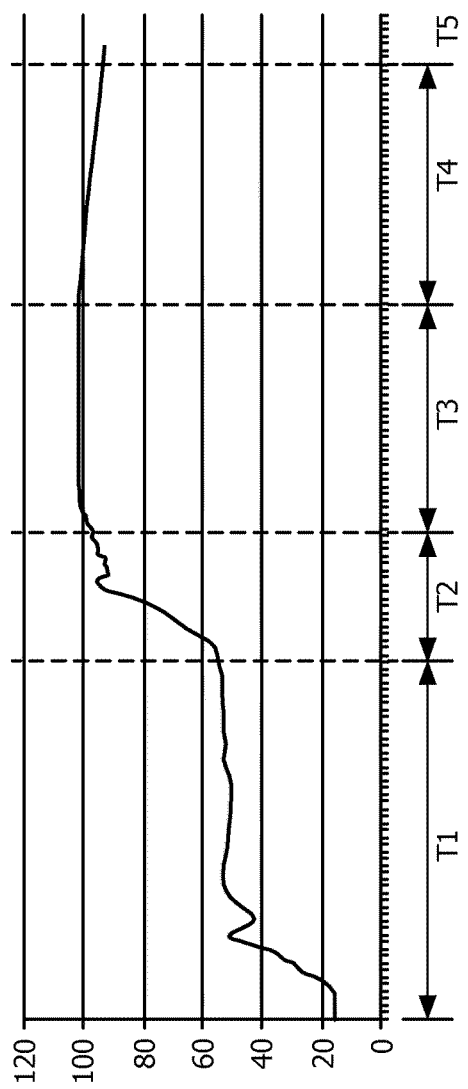
FIG. 1 shows a schematic view of the correlation between temperatures and cooking phases.

Prior to the elucidation of embodiments of the present invention, some descriptions of the cooking phases of rice are given with reference to FIG. 1.

FIG. 1 shows a schematic view of the correlation between the temperatures and cooking phases. The horizontal axis represents time, while the vertical axis represents temperature.

The cooking of starch-containing food, for example rice, is a complex and progressive process. Starch presents in rice granule in two forms: amylose (straight-chain polysaccharide) and amylopectin (branched polysaccharide). Amylose and amylopectin react differently with water during the heating process, due to their structural differences, and leading to five phases, namely:

a) Leaching-out phase: Normally in this phase, temperature increases slowly from room temperature to the target one, for example, 60 degree centigrade. The leaching-out phase is denoted as T1 in FIG. 1. In this embodiment T1 lasts for around 20 minutes. This phase is also called amylose leaching-out (from the rice granule). When soaking in water, amylose, with its straight-chain structure, will leach out from the granule, whereas the amylopectin will not.

b) Heating phase: The temperature ranges from 60 degree centigrade to 100 degree centigrade. The temperature will be quickly increased in this phase. The heating phase is denoted as T2 in FIG. 1. In this embodiment T2 lasts for around 5 minutes. This phase is also called amylose pasting (in the rice-solute) phase. When amylose is heated in the water, it will attracted water molecules with its hydroxyl radicals and it will reduce the viscosity of the rice solute.

c) Boiling phase: The temperature of the food is around 100 degree centigrade. The rice and the water are boiled around 100 degree centigrade for a certain period. The boiling phase is denoted as T3 in FIG. 1. In this embodiment T3 lasts for around 10 minutes. This phase is also called amylopectin water-absorption (in the rice-granule). As the heating progresses, the branch-chain of the amylopectin will be opened up and absorb water molecules by weak bonding between its hydroxyl stems.

d) Saturation phase: In this phase, normally the heaters will stop heating. The cooking ambient (inside the cooking chamber) still has a relative high temperature (around 100, or a little bit less). Some water of the rice surface (top) will be evaporated; while most of the others will not come to the top of the rice, instead they will be absorbed by the rice grain. Therefore, the rice could contain proper water content. The saturation phase is denoted as T4 in FIG. 1. In this embodiment T4 lasts for around 10 minutes.

e) Heat preservation phase: In this phase, the heaters stop heating. The heat preservation phase is denoted as T5 in FIG. 1.

From the above description, it could be obtained that the water has a great influence on the cooking process of the food. As a result, the water has a great influence on the taste of the cooked food.

From FIG. 1, it is apparent that there are correlations between the temperatures and the cooking phases, and there are also correlations between the time periods since the start of cooking and the cooking phases. Therefore, in the following context, although cooking phase is used for illustrating of the embodiments of the invention, it is readily appreciated that the temperature and the time periods may also represent the cooking phases.

Figure 2:
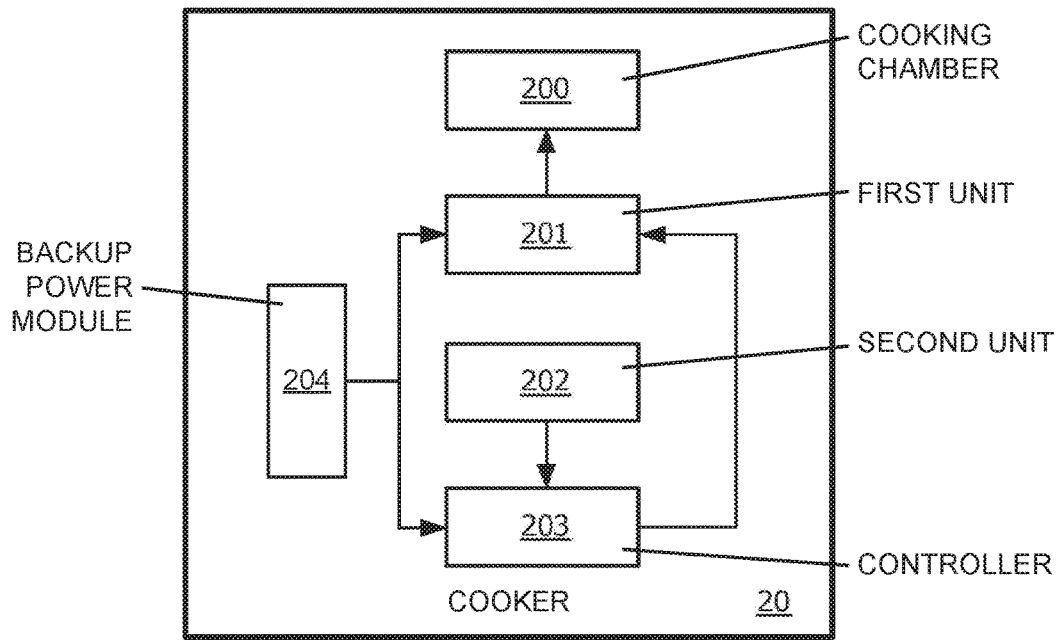
FIG. 2 shows a schematic block diagram of a cooker 10, according to an embodiment of the invention.

FIG. 2 shows a schematic view of a cooker according to an embodiment of the present invention. The cooker 20 comprises a cooking chamber 200, a first unit 201, a second unit 202 and a controller 203.

The cooking chamber 200 is configured to cook food with water. The cooking chamber 200 may comprise at least one heater (not shown in the FIG. 2) for heating the rice and water in the cooking chamber 200. The heat may be side heater, or bottom heater.

The first unit 201 is configured to feed water to the cooking chamber. The term "feed" in the embodiments means add or discharge. The first unit 201 may comprise a water feeding unit to feed fresh water into the cooking chamber 200. The first unit 201 may alternatively or additionally comprise a water discharging unit for discharging the water from the cooking chamber 200.

The second unit 202 is configured to obtain information related to an interruption of the cooking, if the cooking in the cooking chamber is interrupted. The second unit 202 may comprise a timer which is driven by batteries, such as button batteries, therefore when the interruption occurs, the timer is still working. The second unit 202 may also comprise a sensor, to obtain the temperature of the rice and water in the cooking chamber 200.

The controller 203 is configured to operate the first unit 201 according to the information related to the interruption, after the cooking recovers from the interruption.

In an embodiment, the information related to the interruption comprises at least one of the following: a cooking phase of the food at the time of the interruption, a time duration of the interruption, a first temperature of the food when the cooking recovers from the interruption. In the followings, the process of how the controller 203 uses the above information to determine a scheme will be elucidated.

The controller 203 may use the time duration of the interruption to operate the first unit 201. If the time duration of the interruption is shorter than the time duration threshold, the controller 202 operates the first unit 201 to feed water according to the originally determined first scheme. If the time duration of the interruption is equal to or longer than a time duration threshold, the controller 202 operates the first unit to feed water according to a second scheme different from the first scheme.

When the food comprises starch-containing food, and the cooking phase comprises any one of the followings: a leaching-out phase, a heating phase, a boiling phase and a saturation phase, the time duration threshold is dependent on the corresponding cooking phase. Referring back to FIG. 1, the overall duration of one cooking phase varies from one another. For example, the duration of the leaching-out phase is the longest, for example around 20 minutes, while the heating phase is the shortest, for example around 5 minutes. Therefore, the time duration threshold is dependent on the corresponding cooking phase.

In another embodiment, wherein according to the first scheme, the first unit 201 is configured to feed a first amount of water to the cooking chamber 200 after the time of interruption, the controller 203 determines the second scheme in which a second amount of water is fed to the cooking chamber after the cooking recovers, wherein the second amount is less than the first amount. The second scheme differs from the first scheme in that the amount of water to be added is less. Since during the interruption, the rice grains still react with the water, when the interruption recovers, the water needed is reduced.

In another embodiment, the controller 203 determines a second temperature based on the first temperature, and the controller 203 operates the first unit 201 to feed water at the second temperature after the cooking recovers. The temperature of the water fed to the cooking chamber 200 after the interruption recovers is related to the first temperature of the food when the cooking recovers from the interruption. For example, when the interruption occurs, the first temperature of the food is 80 degree centigrade, after the interruption, the temperature of the food drops to 60 degree centigrade. Then the controller 203 determines that the second temperature is around 60 degree centigrade, for example, 55 to 65 degree centigrade. On the one hand, if the temperature is much lower than the first temperature, for example, lower than 50 degree centigrade, it will take longer to heat the newly added fresh water, which will further prolong the cooking process. On the other hand, if the temperature is much higher than the first temperature, for example, higher than 70 degree centigrade, it will cause the surface of the rice grain pasty while the core of the rice grain still hard, which will not bring a satisfied taste to the cooked food.

In another embodiment, the cooking phase when the interruption occurs may be used by the controller 203 to determine a scheme.

For example, the controller 203 determines that the first scheme is to automatically add 200 ml water at the beginning of leaching-out phase (for example, corresponds to at the start of cooking), and then to automatically add another 200 ml water at the beginning of heating phase after (for example, corresponds to 20 minutes from the start of cooking). If before the interruption, the cooker cooks the food in anyone of the leaching-out phase, heating phase or saturation phase, and suddenly the interruption occurs to the cooking. Then after the interruption recovers, the controller operates the first unit 201 to feed the water according to a scheme different from the first scheme. For example, the first unit 201 adds 150 ml, instead of 200 ml fresh water to the cooking chamber 200.

The term "feed water" also may represent discharging water from the cooking chamber 200. For example, if water is first manually added, and the sensor in the cooker 20 detects a first amount of water, for example 50 ml water should be discharged from the cooking chamber 200 at the beginning of the heating phase. Then the cooking is interrupted before the heating phase. Then after the interruption recovers, the controller operates the first unit 201 to discharge 25 ml water from the cooking chamber 200. This is because during the interruption the rice grains still react with the water, and more water is absorbed by the rice grain, so the water amount that should be discharged from the cooking chamber 200 is reduced.

The amount of water discharged from the cooking chamber 200 may be detected and controlled by a unit such as an ultrasonic detector (not shown in figures). Ultrasonic sensors work on a principle similar to radar or sonar which evaluates attributes of a target by interpreting the echoes from radio or sound waves respectively. Ultrasonic sensors generate high frequency sound waves and evaluate the echo which is received back by the sensor. Sensors calculate the time interval between sending the signal and receiving the echo to determine the distance to an object. This technology can be used for measuring fullness of a tank. To measure the amount of liquid in a tank, the sensor measures the distance to the surface of the fluid. Therefore, the amount of the water to be discharged from the cooking chamber 200 can be controlled.

On the other hand, if the interruption occurs at the heat preservation phase, the controller 203 operates the first unit 201 to feed the water according to the first scheme. For example, if the first scheme comprises spraying 10 ml water to the bottom of the rice at the beginning of heat preservation phase (for example, corresponds to after 40 minutes from the start time of cooking food), then after the interruption, the controller 203 operates the first unit to control to spray 10 ml water to the bottom of the rice. This is because when the cooking enters heat preservation phase, the cooking chamber 200 is no longer heated, therefore the interruption only influence the cooking process slightly.

Besides, the controller 203 may use both the cooking phase of the food at the time of the interruption and the duration of the interruption to operate the first unit 201. For example, the controller 203 may determine a first scheme for the first unit 201. The first scheme does not take the interruption into consideration. When the cooking phase of the food at the time of the interruption corresponds to any one of a leaching-out phase, a heating phase, a boiling phase or a saturation phase of the starch-containing food and the interruption lasts for a duration longer than the time duration threshold, the controller 203 operates the first unit 201 to control the water fed to the cooking chamber 200 according to an scheme different from the first scheme. When the cooking phase of the food at the time of the interruption corresponds to a heat preservation phase, or although the cooking phase of the food at the time of the interruption corresponds to any one of a leaching-out phase, a heating phase, a boiling phase or a saturation phase of the starch-containing food, the interruption lasts for a duration shorter than the time duration threshold of the starch-containing food, the controller 203 is further configured to operate the first unit 201 to control the water according to the first scheme.

In another embodiment, according to the first scheme, the cooking chamber 200 is configured to cook the food in the current cooking phase for a remained time duration, when the cooking phase is interrupted. The controller 203 is further configured to control the cooking chamber 200 to resume the interrupted cooking phase for a time period shorter than the remained time period.

For example, according to the first scheme, the overall duration that the food is cooked in the boiling phase is 10 minutes. The food has already been cooked for 5 minutes in the boiling phase and the food is to be cooked in the boiling phase for another 5 minutes when the interruption occurs. After the interruption recovers, the controller 203 operates the cooking chamber 200 to cook the food for 2 minutes during the boiling phase, and then enters the saturation phase. This is because although the interruption occurs, due to the heat preservation nature of the cooking chamber 200, the temperature of the food may be maintained, and the rice grain still reacts with the water. Therefore, when the interruption recovers, the duration in the cooking phase may be reduced.

Moreover, if the interrupted cooking phase corresponds to any one of the following: a leaching-out phase, a heating phase, a boiling phase, a saturation phase, when the interruption recovers, the resumed time period of the cooking phase should be shorter than the originally determined one according to the first scheme. Because the above cooking phases are more sensitive to the ratio of rice to water, and the time duration of the interruption should be taken into consideration.

In another embodiment, the cooker further comprises a backup power module 204 (FIG. 2) for providing electricity for supplying water (i.e., via first unit 201) to the cooking chamber 200 within the interruption. The backup power module 204 guarantees that the process of feeding water still continues when the interruption occurs just at the moment that the first unit 201 is feeding water.

Alternatively, the cooker 20 is equipped with a backup power module 204 (FIG. 2). The information related to the interruption is an indication or detection of the occurrence of the interruption. With the backup power module 204, when the interruption occurs, the controller 203 could operate the first unit 201 to add, during the interruption, all the un-fed water that is scheduled to be applied to the cooking chamber 200 according to the first scheme (the sum of the amounts of all the remained water if, for example, the first scheme requires feedings water for a plurality of times). That is to say, when the cooker 20 is recovered from the interruption, there is no need for the cooker 20 to add water anymore, because the water has already been added during the interruption. In addition, in this simplified solution, when the cooker 20 is recovered from the interruption, the cooker 200 just resumes the cooking process as if there is no interruption occurred. For example, the interruption happens in a leaching-out phase which has 5 minutes left at the time of the interruption. Once the cooker 20 is recovered from the interruption, it continues with the cooking by operating the cooker 20 in the leaching-out phase for 5 minutes and then proceed to the next phase, e.g., the heating phase.

In the above embodiment, starch containing food is taken as an example for illustration, it is readily appreciated that the food also comprises vegetables, fruit etc, as long as water is needed during the process of cooking.

Figure 3:
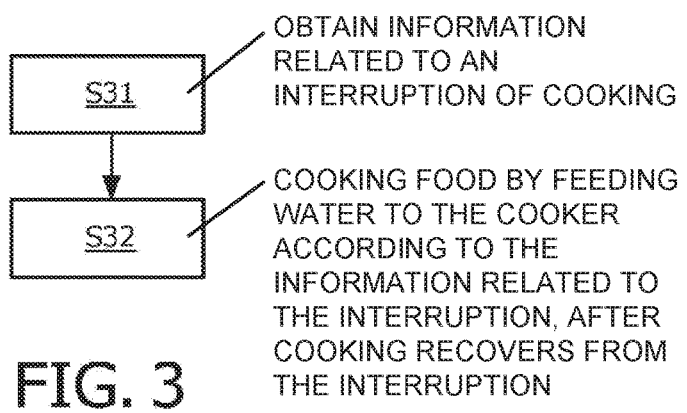
FIG. 3 shows the flowchart of the method of cooking rice, according to an embodiment of the invention.

The following is the description of the method part of the invention. FIG. 3 shows a flow chart of the method of the invention. The method comprises a step S31 of obtaining information related to an interruption of the cooking, if the cooking is interrupted; and a step S32 of cooking the food by feeding water to the cooker according to the information related to the interruption, after the cooking recovers from the interruption.

The information related to the interruption comprises at least one of the following: a cooking phase of the food at the time of the interruption, a time duration of the interruption, or a first temperature of the food when the cooking recovers from the interruption.

In an embodiment, the step S32 of cooking further comprises feeding the water to the cooking chamber according to a first scheme in case that no interruption occurs, wherein step S32 of cooking further comprises determining whether the interruption is shorter than a time duration threshold, and feeding the water according to the first scheme if the interruption is shorter than the time duration threshold, or feeding the water according to a second scheme different from the first scheme if the interruption is not shorter than the time duration threshold.

In another embodiment, according to the first scheme, in step S32, a first amount of water is fed after the time of interruption, according to the second scheme, a second amount of water is fed to the cooking chamber after the cooking recovers, wherein the second amount is less than the first amount.

In another embodiment, the step S32 of cooking further comprises determining a second temperature based on the first temperature, and feeding water at the second temperature after the cooking recovers.

The above units can be implemented by way of softwares, hardwares or their combinations. For example, controller can be implemented by software and the program codes that achieve the functions are stored in a memory and are loaded and executed by a micro controller unit (MCU). The MCU also controls the hardware components. Those skilled in the art could implement embodiments of the invention in various ways according to the concept and principle taught by the description.

Those ordinary skilled in the art could understand and realize modifications to the disclosed embodiments, through studying the description, drawings and appended claims. All such modifications which do not depart from the spirit of the invention are intended to be included within the scope of the appended claims. The word "comprising" does not exclude the presence of elements or steps not listed in a claim or in the description. The word "a" or "an" preceding an element does not exclude the presence of a plurality of such elements. In the practice of present invention, several technical features in the claim can be embodied by one component. In the claims, any reference signs placed between parentheses shall not be construed as limiting the claim. The term "at least one of A, B, C" can cover any or any combination of the following: 1. A alone, 2. B alone, 3. C alone, 4. A and B, 5. A and C, 6. B and C, 7. A, B, C.

What is claimed is:

1. A cooker, comprising:
   a cooking chamber configured to cook food with water;
   a first unit that comprises a water feeding device configured to feed water to the cooking chamber and a water discharging device configured to discharge water from the cooking chamber;
   a second unit, responsive to an interruption of a cooking program for cooking the food in the cooking chamber, for obtaining information related to the interruption, wherein the interruption comprises a stop of cooking temporarily which is not according to the cooking program; and
   a controller configured to (i) control an operation of operate the first unit according to the cooking program alone in response to an absence of the interruption, and (ii) control the operation of the first unit according to a combination of both (a) the cooking program and (b) the obtained information related to the interruption of the cooking program, in response to a recovery of the cooking program from the interruption for cooking in the cooking chamber recovers from the interruption, wherein the recovery includes at least one of a power recovery or a user movement of the cooking chamber back in contact with a heater,
   wherein the information related to the interruption comprises at least one of
   (i) a cooking phase of the food at a time of the interruption,
   (ii) a time duration of the interruption,
   (iii) a first temperature of the food when the cooking program for cooking in the cooking chamber recovers from the interruption, and
   (iv) a detection of the interruption.

2. The cooker according to claim 1, wherein the controller is further configured to determine a second temperature based on the first temperature, and operate the first unit to feed water at the second temperature after the cooking program for cooking in the cooking chamber recovers.

3. The cooker according to claim 1, wherein the first unit is configured to feed the water to the cooking chamber according to a first scheme in case that no interruption occurs,
   the controller is further configured to operate the first unit to feed the water according to the first scheme after the cooking program for cooking in the cooking chamber recovers from the interruption if the cooking phase at the time of the interruption is a heat preserving phase; and
   the controller is further configured to operate the first unit to feed the water according to a second scheme different from the first scheme after the cooking program for cooking in the cooking chamber recovers from the interruption if the cooking phase at the time of the interruption is one of a heating phase, a boiling phase, or a saturation phase.

4. The cooker according to claim 1, wherein the first unit is configured to feed the water to the cooking chamber according to a first scheme in case that no interruption occurs,
   wherein the controller is further configured to determine whether the interruption is shorter than a time duration threshold, and operate the first unit to feed the water according to the first scheme if the interruption is shorter than the time duration threshold, and
   the controller is further configured to operate the first unit to feed the water according to a second scheme different from the first scheme if the interruption is not shorter than the time duration threshold.

5. The cooker according to claim 4, wherein the food comprises starch-containing food, and a cooking phase of the food at a time of the interruption comprises at least one of a leaching-out phase, a heating phase, a boiling phase and a saturation phase, and
wherein the time duration threshold is dependent on a corresponding cooking phase of the food at the time of the interruption.

6. The cooker according to claim 4, wherein according to the first scheme, the first unit is configured to feed a first amount of water to the cooking chamber after the time of interruption,
wherein according to the second scheme, a second amount of water is fed to the cooking chamber after the cooking program for cooking in the cooking chamber recovers, and wherein the second amount is less than the first amount.

7. The cooker according to claim 1, wherein according to a first scheme the cooking chamber is configured to cook the food in a current cooking phase for a remained time duration, when the current cooking phase is interrupted, and
wherein the controller is further configured to control the cooking chamber to resume the interrupted current cooking phase for a time period shorter than the remained time period.

8. The cooker according to claim 7, wherein the controller is configured to control the cooking chamber to resume the interrupted current cooking phase for a time period shorter than the remained time period if the interrupted current cooking phase is at least one of a leaching-out phase, a heating phase, a boiling phase, and a saturation phase.

9. The cooker according to claim 1, further comprising:
a backup power module for providing electricity to the controller and first unit for supplying water, via the first unit, to the cooking chamber within the interruption, wherein the backup power module guarantees that a process of feeding water continues when the interruption occurs just at a moment that the first unit is feeding water.

* * * * *